Dec. 22, 1959    K. W. STIMM    2,917,969
LIGHT METER
Filed March 18, 1954    5 Sheets-Sheet 1
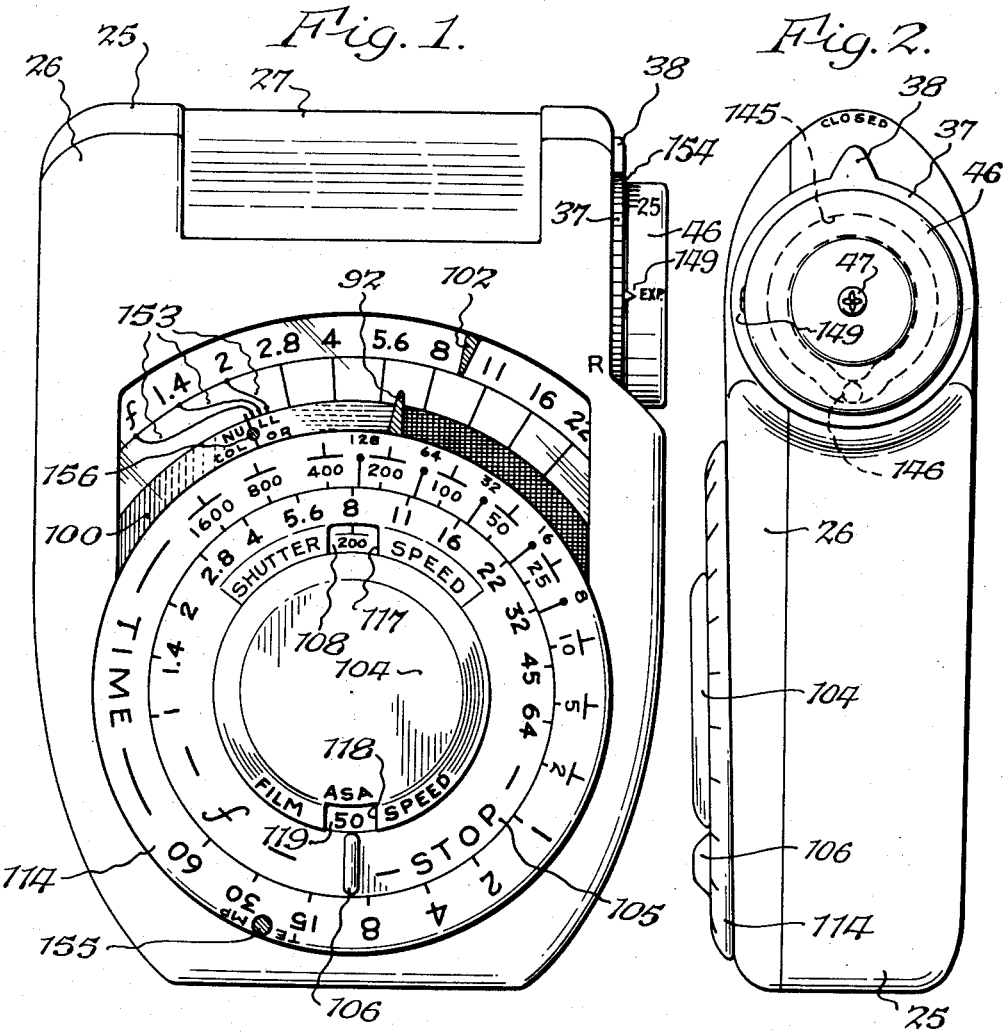
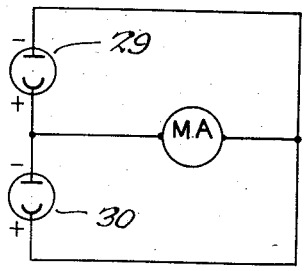
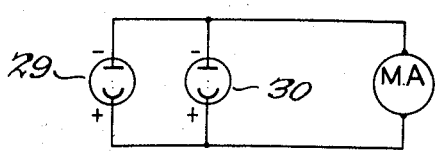
INVENTOR.
Kean W. Stimm,
BY
Parker, Carkmow & Farmer,
Attorneys.

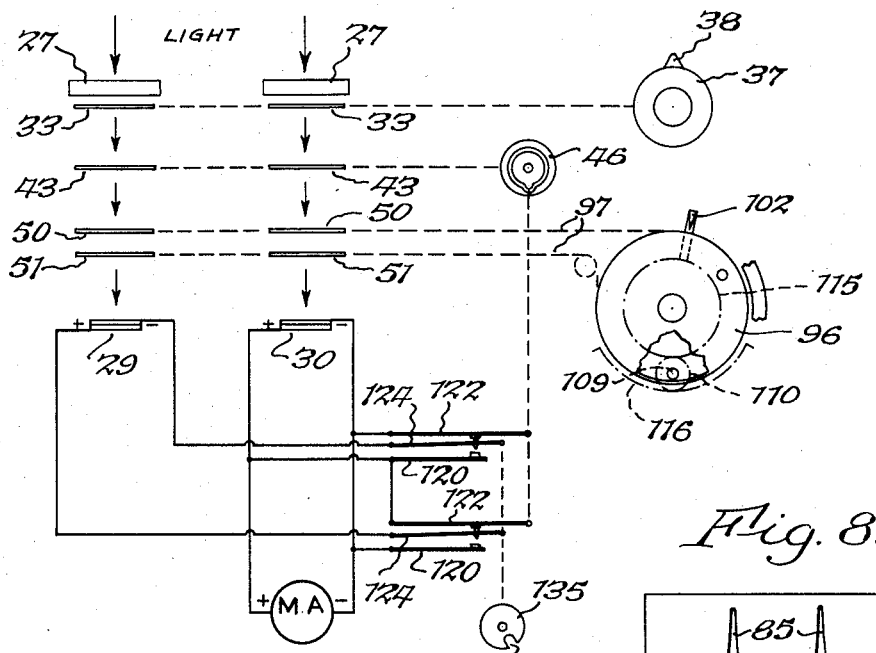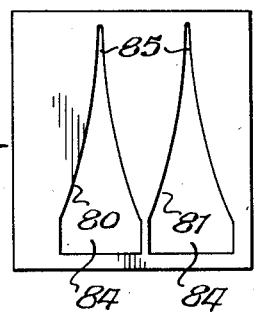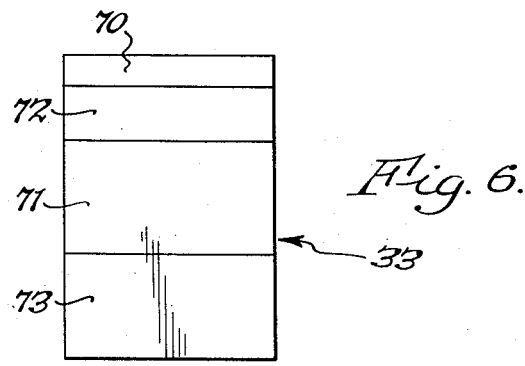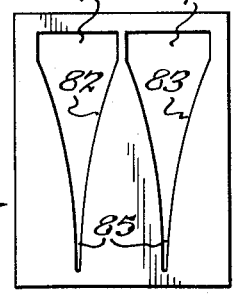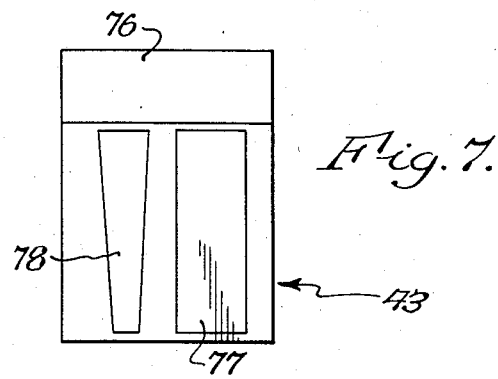

Dec. 22, 1959     K. W. STIMM     2,917,969
LIGHT METER
Filed March 18, 1954     5 Sheets-Sheet 3
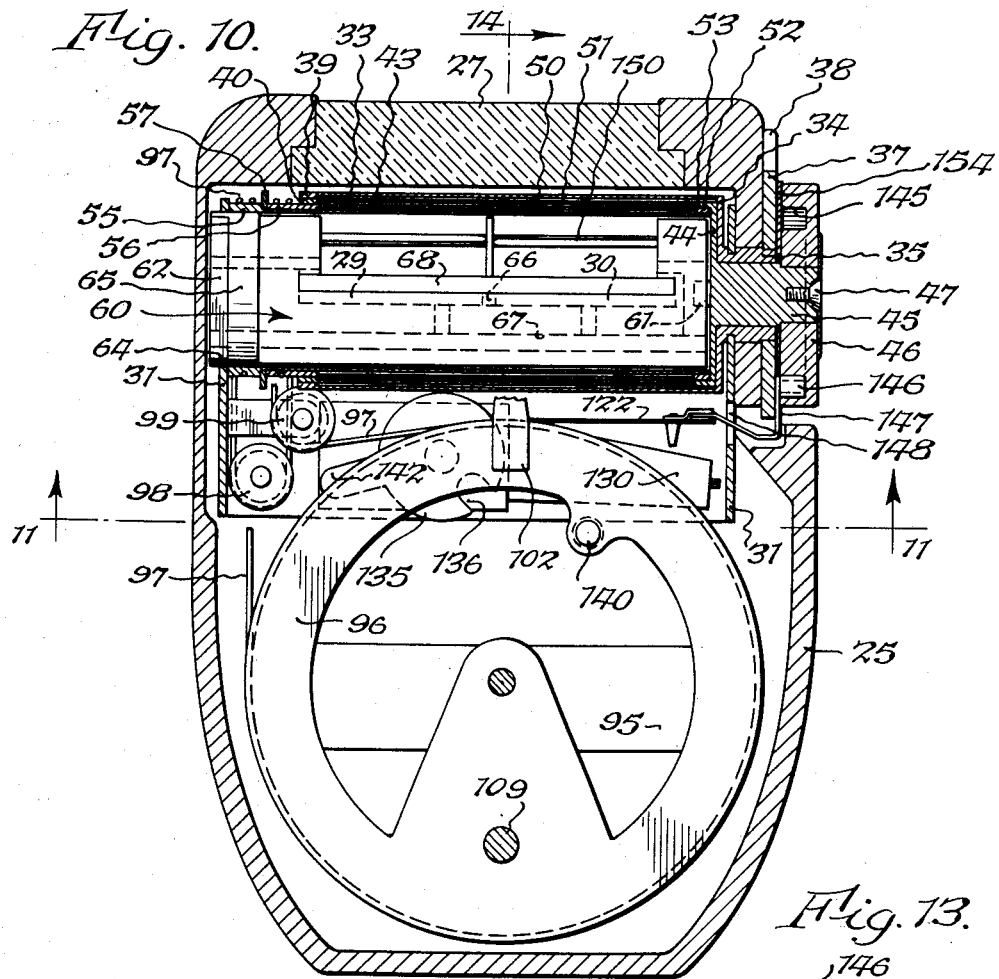

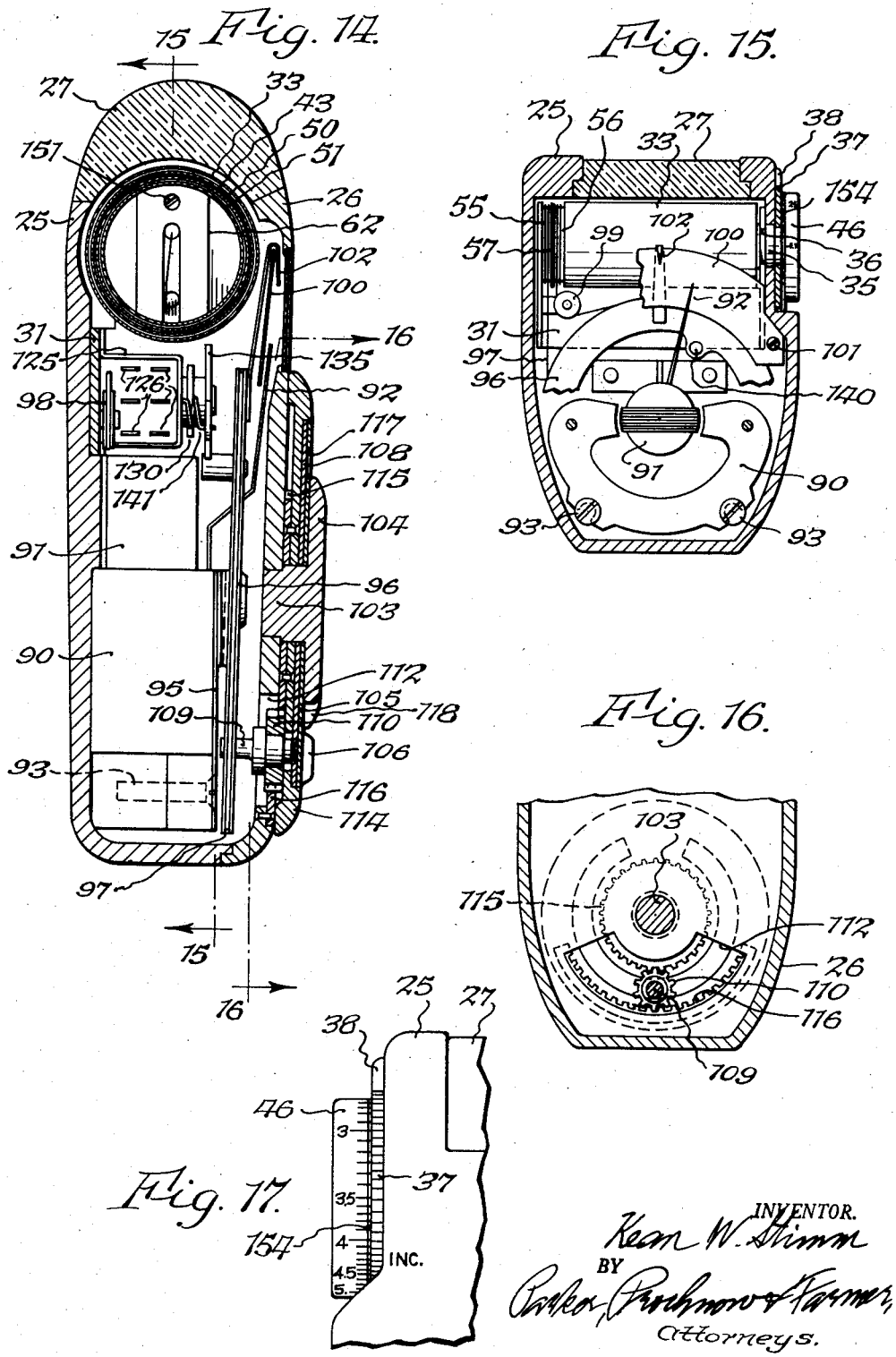

Dec. 22, 1959   K. W. STIMM   2,917,969
LIGHT METER
Filed March 18, 1954   5 Sheets-Sheet 5
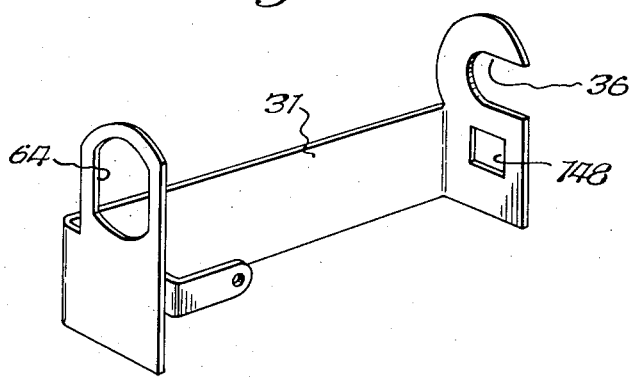
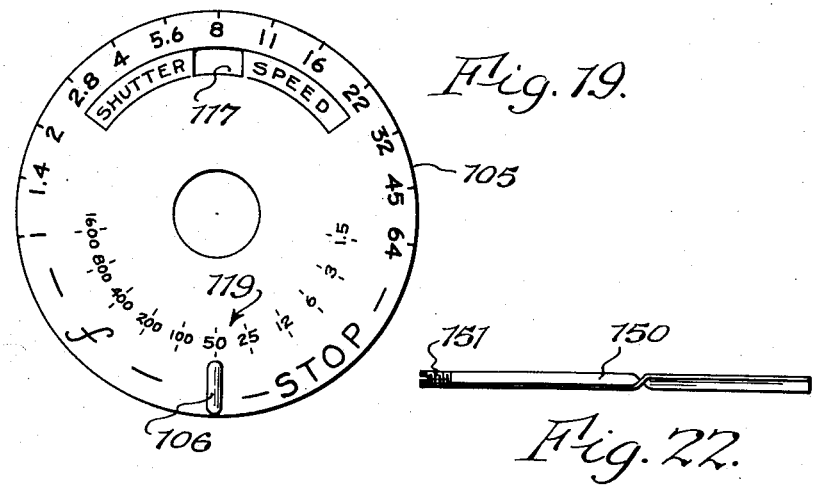
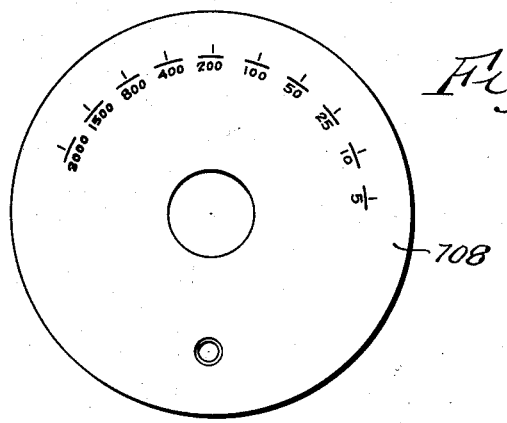
INVENTOR.
Kean W. Stimm,
BY
Parker, Brochman & Parmer,
Attorneys.

United States Patent Office 2,917,969
Patented Dec. 22, 1959

2,917,969
LIGHT METER
Kean W. Stimm, Williamsville, N.Y.

Application March 18, 1954, Serial No. 417,174

17 Claims. (Cl. 88—23)

This invention relates to light meters which are intended primarily for use in connection with photography.

In the art of photography and particularly color photography but also including black and white photography, it is highly important that the light sensitive emulsion known as the film be properly exposed. This exposure being directly related to the shutter speed of the camera, the relative lens opening of the camera, the sensitivity of the film or film speed and the amount of light available. In addition, it is of extreme importance that the spectral distribution of the light source accurately match the spectral sensitivity of the film. Incorrect exposure results in a loss of contrast in the final picture whereas an incorrect spectral match or color balance between light source and film will result in highly distorted colors with color film or a further contrast distortion with black and white film. In the art of photography, it is absolutely essential that an accurate determination of light intensity and color balance be made for accurate contrast and color rendition in the final photograph. This requirement is made particularly poignant because of the tremendous range of light intensities and color balance of natural outdoor lighting and of various types of indoor lighting as compared with the limited range of light sensitive emulsions or "film."

These measurements of the light intensity and color balance of the source of illumination should be made just prior to taking the photograph. Depending on the lighting conditions it is frequently desirable to use different general techniques for determining the information. Determination of exposure may be made by the incident light method wherein the total light illuminating the subject as seen from the camera position is measured. Incident light measurements require the light meter to have a wide light acceptance angle. If exposure is determined by the reflected light method, which is a measure of the light reflected from the subject towards the camera, the light meter must have a narrow light acceptance angle. In color balance measurements, it is generally desirable to determine the average color balance of a multiplicity of light sources which illuminate the subject which requires the light meter to have a wide light acceptance angle. However, it is frequently important to determine the color balance of a single concentrated source of illumination and here the light meter should have a narrow light acceptance angle.

In light meters as heretofore constructed, the meters were designed primarily for the purpose of determining exposure and generally with emphasis on one technique only. Meters are also known by which color balance of light can be determined. Many attachments and accessories are known by which existing exposure meters may be converted for different types of measurements, but it is generally inconvenient for a photographer to carry with him different types of instruments and accessories. It further being desirable that the necessary measurements of light made just prior to taking the photograph be made quickly and efficiently with a minimum of confusion.

One of the objects of this invention is to provide a single instrument by means of which both light intensity and color balance may be determined.

Another object is to provide a small compact instrument by means of which both determination of exposure and color balance of light may be effected, and in which only slight adjustments are necessary to change the instrument from determining light intensity to determining color balance.

A further objective is to produce a light meter whose cost is only slightly greater than either a color balance meter or an exposure meter, this being accomplished by using certain component parts of the meter for both purposes.

It is also an object of this invention to provide a combination meter of this type of very compact and readily portable construction with the resulting convenience in handling the same.

It is also an object of this invention to produce a light meter which operates with a degree of accuracy comparable to exposure meters and color balance meters of similar size and cost.

It is also an object of this invention to provide an instrument for measuring light intensity to determine the exposure, either by incident or by reflected light methods, and also to determine color balance.

A further object is to provide a light meter of this type in which the same photovoltaic cells may be used for both measurements.

A further object is to provide an instrument of this type with a pair of photovoltaic cells which may be connected differently when used for color balance measurement and for exposure measurements.

A further object is to provide a light meter of this type which provides for calibration and adjustments to ensure accuracy for color balance measurements.

Since a light meter will not read correctly unless the dials are in their correct positions, I have provided an interlock system for dials which is simple and practically foolproof, thereby preventing incorrect readings of the instrument.

Another object of this invention is to provide a light meter with means by which the light opening may be completely closed by means of the same part which is used to convert the light meter for either incident or reflected light measurements, thus minimizing the need for meter needle locking devices, such as heretofore employed, and providing maximum protection to the optical component.

Another object is to provide a light meter which is so constructed that all information for both color balance and exposure measurements will appear at the top half of the light meter face so that the light meter may be read while held in one hand and manipulated with the other hand.

A further object is to provide a two photocell method and apparatus with an electrical connection such that the microammeter will read the differential generated current as developed by the ratio of light in one portion of the light spectrum as compared with the total light of the spectrum, or another portion of the photocell spectrum.

A further object is to provide a light meter capable by itself and without attachments of indicating a range of light intensities many times greater than the range of the indicating micro-ammeter and photocell alone.

It is also an object of this invention to provide an exposure meter with a direct reading feature whereby the meter needle deflects to the correct "f" stop for the shutter speed and film speed set on the computer dial, thus providing a system, to permit quick reading of the meter.

A further object of this invention is to provide a light meter of this type in which a single logarithmic microammeter with increased sensitivity at the zero or null position may be used for measurements of both light intensity and color balance.

A further object of this invention is to provide an instrument for determining color balance which may be made responsive to a narrow light acceptance angle or to a wide acceptance angle and also to measure light intensity.

It is also an object of this invention to provide a means by which the micro-ammeter needle deflection may be directly transferred by mechanical methods to the computer dials to show all correct shutter speed and "f" stop combinations appropriate for the film speed, this method being effective over the entire range of the instrument without introducing parallax errors.

In addition, it is an object of this invention to eliminate the usual high and low or multiple range method of covering the range of light intensities to which the instrument is useful without reducing the range of illumination.

Other objects and advantages will be apparent from the following description of one embodiment of the invention and the novel features will be particularly pointed out hereinafter in connection with the appended claims.

In the accompanying drawings:

Fig. 1 is a face view of a light meter embodying this invention.

Fig. 2 is a side view thereof.

Fig. 3 is a diagram of connections showing the arrangement of the photovoltaic cells in series with a microammeter bridge connection when the meter is set for color balance indication.

Fig. 4 is a diagram of connections for use in determining the light intensity.

Fig. 5 is a diagrammatic view showing the arrangement of certain parts of the optical system of the instrument relatively to each other and their connections with other parts of the instrument.

Fig. 6 is a face view of the development of one of the sleeves or cylinders of the optical system when laid flat.

Fig. 7 is a similar developed view of another cylinder or sleeve of the optical system for use in determining color balance.

Fig. 8 is a similar developed view of one of the variable aperture sleeves of the optical system.

Fig. 9 is a similar developed view of another variable sleeve which cooperates with the sleeve shown in Fig. 8.

Fig. 10 is a central sectional elevation of the instrument.

Fig. 11 is a fragmentary, transverse sectional view thereof, partly on line 11—11, Fig. 10, showing a bottom plan view of the switch mechanism.

Fig. 12 is an elevational view of a switch mechanism as seen at 90 degrees from the view shown in Fig. 11.

Fig. 13 is an end view thereof.

Fig. 14 is a transverse central sectional elevation of the light meter, on line 14—14, Fig. 10.

Fig. 15 is a sectional elevation thereof, on a reduced scale on line 15—15, Fig. 14.

Fig. 16 is a fragmentary, sectional elevation thereof, on line 16—16, Fig. 14.

Fig. 17 is a fragmentary elevation of the rear upper, right-hand corner portion of the instrument showing color balance dial knob.

Fig. 18 is a perspective view of a frame on which the optical system and other parts of the instrument are mounted.

Fig. 19 is a face view of one of the dials of the instrument.

Fig. 20 is a face view of another dial.

Fig. 21 is a face view of a development of a scale used on one of the adjusting knobs of the instrument.

Fig. 22 is a longitudinal view of ratio bar for varying the admission of light to the photoelectric cells.

The housing in which the various parts of the meter are mounted may be of any suitable shape and material. The housing is preferably made of molded plastic material and includes a main or body portion 25 which houses most of the parts of the light meter, and a front or cover portion 26 on which various dials may be mounted. The two parts of the housing may be securely connected to each other in any desired manner. The shape of the housing is preferably such that the sides converge to a limited extent toward the bottom thereof, so as to facilitate the holding of the instrument in one hand of the user.

The upper portion of the housing is formed to support the optical parts of the instrument, and a portion of the upper wall of the housing is provided with a suitable lens or light-admitting window 27 which is rigidly secured on the upper portion of the main housing part 25. This lens or window may be of any desired shape, a meniscus shape being preferred. It is desired, however, that the lens be of a shape to provide the maximum suitable admission of light to the photocell.

Immediately beneath the lens 27 there are provided a series of members or screens which control the passage of light to a light sensitive member, such as a photo electric cell. These light controlling or modifying members are movably mounted in the light meter so that different portions thereof may be placed between the lens 27 and the photoelectric cell. These screens may be of any suitable shape and in the construction shown by way of example, these screens are in the form of a plurality of concentrically mounted sleeves or hollow cylinders which may be turned about their longitudinal axes for controlling the light which passes to two photoelectric cells 29 and 30, arranged within the cylinders. These screens or cylinders may be mounted in the light meter in any suitable or desired manner, for example, by means of a frame member 31, shown also in Fig. 18, suitably mounted on the housing member 25. These sleeves are mounted on the frame member to turn relatively to each other in any suitable or desired manner, preferably so that the cylinders themselves are out of contact with each other so as not to mar or scratch the surfaces of the same. The outer sleeve or cylinder 33, hereinafter referred to as the "light selector sleeve," has one end thereof secured to a disk 34 which may be formed integral with a hub 35. This hub is provided with an annular recess formed to fit into an opening 36 formed in one end of the frame member 31, the inner end of this opening being of semicircular form to fit snugly in the recess to correctly hold the outer sleeve in place and permit the sleeve to turn. The hub 35 is suitably secured to a disk 37 having a knob or handle portion 38 by means of which the light selector sleeve 33 may be turned about its axis into any desired position. The other end of the light selector sleeve is provided with a thin ring 39 which is movable about another ring 40 secured to the second sleeve 43 of the optical system, also referred to as the "color balance" or "filter ratio sleeve." This sleeve 43 is secured at the end thereof opposite the ring 40 on a flange 44 which may be formed integral with or secured to a hub 45 which is journalled to rotate within the hollow hub 35. A dial 46 is suitably secured to the hub 45, for example, by means of a screw 47, which may be loosened to permit the dial 46 to be correctly positioned relatively to the hub 45 and to the second sleeve 43. Consequently, by rotating the dial 46, the second sleeve 43 may be rotated as desired.

Suitably supported within the color balance sleeve 43 are two variable aperture sleeves 50 and 51. The outer of these two sleeves is provided at the right hand end thereof, as seen in Fig. 10, with an enlargement or ring 52 which is rotatably mounted within a flange 53 on which the second or filter ratio sleeve is mounted and which, in turn, is mounted on the disk or flange 44. This guides the right-hand end of the sleeve 50, and the right-hand end of the sleeve 51 extends within the ring 53 and is, therefore, guided thereby. At the left end of these two sleeves, the inner sleeve 51 is mounted on a ring 55 and the sleeve 50 is mounted on a concentric ring 56. Both of these rings form pulleys over which cables may operate, as will be described hereafter, and these two rings are separated by a narrow ring 57 of large diameter to separate the two rings 55 and 56.

The photoelectric cells 29 and 30 are mounted in a suitable holder 60 which may be made of any suitable material, preferably a non-conductant of electricity. This holder is provided at one end wall thereof with an aperture into which a post or stud 61 extends which may be an integral part of the hub 45. The other end wall 62 of the holder is provided with two flat sides which fit into and are held against rotation by the flat sides of an opening 64 formed in a part of the frame member 31, see Fig. 18. Consequently, it will be obvious that the photoelectric cell holder will be held against rotation, and this holder may also be provided with an annular surface 65 about which the ring 55 connected with the inner sleeve 51 may rotate, so that the cell holder forms a support for the left-hand ends of the four concentric sleeves.

The photoelectric cell holder is provided in the upper portion thereof with suitable seats for the cells and has an insulating partition 66 which separates the two cells. The holder is also provided with a passage 67 through which conductors connected with the photoelectric cells may then pass out of the end wall 62 of the cell holder through a suitable opening formed therein and extend outwardly to a switch mechanism. 68 represents a plate of glass or other transparent material which holds the photoelectric cell in place. The ends of this plate extend into slots in the end portions of the cell holder.

In Fig. 5, I have shown diagrammatically the relationship between the four concentric sleeves, the photoelectric cells and the actuating mechanisms for the sleeves relatively to each other and to the lens 27, as well as the circuitry connected with the cells. For the sake of clarity, the lens 27 is shown in two parts, and only fragmentary sections of the four sleeves are shown in this figure. The letters MA represent the microammeter.

In Fig. 6, I have shown the outer sleeve 33 developed to lie in a plane. It will be noted that this sleeve includes an area 70 which is opaque. This sleeve also has another opaque area 71 and between these two opaque areas is a clear or transparent area 72. This sleeve also includes a light scattering area 73. The functions of these areas in connection with my light meter will be hereinafter described. The opaque area 71 is considerably longer in the direction of the periphery of the sleeve and serves to overlie the entire optical system so that no light can pass to the photoelectric cells when the light meter is not in use, thus affording maximum protection to the optical elements and insuring greater protection to the microammeter from shock while not in use.

Fig. 7 shows a development of the sleeve 43 which has a clear area 76 at one end thereof. The remainder of this sleeve is opaque except for a transparent insert 77 of a color which is used as a standard of comparison for determining color balance. This transparent color strip is of such width that light passing through the same will pass to one only of the photoelectric cells. The other photoelectric cell will receive light through a space 78 which varies the total amount of light admitted to the cell. For example, the space 78 may vary in width from one end to the other and which may be either clear or of a color differing from that of the insert 77, the purpose of these colored sections being to determine the ratio of light in one portion of the spectrum as compared to another portion of the spectrum or the total spectrum. It will be obvious that as this sleeve 43 is turned, the tapering space 78 will vary the amount of unfiltered light which passes to the other photoelectric cell.

Figs. 8 and 9 show the developments of the two sleeves 50 and 51. These sleeves are opaque, except for the open or transparent, wedge-shaped spaces 80 and 81 in the sleeve 50 and 82 and 83 in the sleeve 51, arranged so that the narrow ends of these spaces face in opposite directions. These clear or cutout portions of the two sleeves are arranged to cooperate with each other when the sleeves are revolved in opposite directions, so that when the relatively wide portions 84 of the two sleeves are opposite each other, the maximum amount of light will pass to the two photoelectric cells. When the sleeves are rotated so that the narrow portions 85 adjacent to the apexes of the cutout portions are opposite each other, then it will be obvious that the minimum amount of light will pass to the two photoelectric cells.

The current produced by the photoelectric cells is conducted to a suitable electric current meter such, for example, as a micro-ammeter. The micro-ammeter used is preferably a logarithmic movement null indicator type instrument with maximum sensitivity at the null position and such that the maximum clockwise deflections are materially greater than those of the maximum counterclockwise deflections. This arrangement provides a conventional scale length for light intensity measurements and a nearly equally long scale length for the null balance type measurements of color balance or color temperature. This micro-ammeter is located in the lower part of the housing of the instrument and includes a field piece 90 and an armature 91 suitably pivoted to swing about an axis intermediate of the ends of the poles of the field 90, and a needle or pointer 92 is secured to the armature and moves therewith. The meter is not shown herein in detail, since it is of the usual construction such as commonly used in connection with light meters, including zero and sensitivity adjustments, and may be secured to the housing in any suitable manner, for example, by means of a pair of screws 93 engaging the wall of the main housing member 25. The micro-ammeter field piece 90 also serves to support certain parts of the instrument thereon, including a supporting plate 95, Fig. 14, which has a pivotal connection with a cable drive ring 96. This cable drive is used for rotating the two sleeves 50 and 51 in opposite directions to obtain a continuously variable adjustment of the light opening over its range. For this purpose, the cable drive ring is grooved to receive a flexible cable 97 which is guided to pass over the rings 55 and 56 of the sleeves 51 and 50 respectively. The cable is guided over idler pulleys 98 and 99, pivotally mounted on the frame member 31 in such a manner as to rotate the sleeves 50 and 51 in opposite directions. The ends of the cable may be secured to the cable drive ring in any suitable manner, not shown. Any other suitable or desired drive for accomplishing the desired result may be employed.

100 represents a meter scale which is suitably mounted in fixed position, for example, by means of screws 101 on the main housing part 25, see Figs. 14 and 15, and relatively to which the meter needle 92 moves. This meter scale 100 is also employed to indicate the position of the cable ring drive and for that purpose the cable ring or pulley is provided with a pointer 102 suitably secured thereto and extending in rear of the meter scale and then forwardly to extend across the upper edge thereof and downwardly across the upper edge of the front face of the meter scale. The meter scale is visible through an opening in the front housing part 26, and this opening is preferably covered by a transparent window. It will be noted that the lower part of the meter scale has a colored band which, under some circumstances, may be useful in connection with adjusting the instrument to determine color balance, but this colored band is not essential to the operation of the instrument and may be omitted if desired. The upper part of this scale is graduated to indicate $f$ stop values.

The front housing member 26 is provided with a plurality of dials mounted on the front face thereof. These dials may be pivotally mounted on the front housing member in any suitable manner, and in the construction illustrated by way of example, the front housing member has a stud or hub portion 103 extending outwardly therefrom and rigidly secured thereto, and this stud has a disk 104 rigidly secured thereto or formed integral therewith. Rotatable about the hub 103 is an *f* stop dial 105 which is preferably provided with an outwardly extending knob or projection 106 adjacent to its periphery, by means of which this dial may be turned.

There is also mounted on the hub 103 a shutter speed dial 108 having a pivot pin 109 secured thereto. The friction between the disks 104 and dial 105 is greater than the friction between the dial 105 and the next adjacent dial 108 so that turning of the dial 108 will not cause turning of the dial 105. This pivot pin extends into engagement with the cable drive pulley or ring 96. Since the axis of the stud 103 on which the shutter speed dial 108 is secured is concentric with the axis about which the cable drive ring rotates, it will be obvious that the cable drive ring and shutter speed dial 108 will rotate in synchronism, and both will rotate in accordance with the variable aperture sleeves 50 and 51. The stud 109 of the shutter speed dial passes through an arcuate slot 112 in the front housing member 26.

A time dial 114 is also journalled to rotate about the hub 102. The peripheral portion of this dial extends outwardly beyond the other two dials 105 and 108, where it may be readily turned by hand. This time dial has a gear 115 rigidly secured thereto, for example, by rivets, and the teeth of this gear mesh with the teeth of a pinion 110 which is journalled to rotate about the pin 109. The pinion teeth also mesh with a stationary gear 116 which is riveted or otherwise secured to the front part 26 of the housing. Consequently, it will be obvious that when the time dial 114 is turned about the pivot or stud 103, the gear 115 turns with the same and also produces rotation of the pinion 110. Consequently, since the pinion also engages with the fixed gear 116, rotation of the pinion produces rotation of the pivot pin 109 around hub 103 and also of the cable drive disk or member 96 and shutter speed dial 108, which in turn results in rotating the variable aperture sleeves 50 and 51 in opposite directions relatively to each other for controlling the amount of light which may pass to the photoelectric cells. The turning of the cable drive ring, of course, also moves the pointer 102 relatively to the stationary scale 100. Since the pivot pin 109 is secured to the shutter speed dial 108, this dial will also be turned by the pivot pin 109.

The *f* stop dial or disk 105 and the graduations thereon are shown in Fig. 19, and Fig. 20 shows the graduations on the shutter speed dial 108. The *f* stop dial also has an opening 117 thereon through which the shutter speed graduations on the dial 108 may be seen. The stationary disk 104 has a recess or window 118 in the lower portion thereof through which the film speed numerals 119 on the lower portion of the *f* stop dial may be seen. The film speed graduations 119 are arranged in mathematically correct relation to the graduations on the *f* stop scale.

It will thus be noted that the shutter speed dial 108, the movable pointer 102 and the variable aperture sleeves 50 and 51 are driven by the time dial. The pointer 102 and the shutter speed dial 108 move at the same angular velocity and in the same direction. The graduations of the shutter speed dial are related to the variable apertures to halve the indicated shutter speed for each doubling of the aperture openings. The variable aperture is a minimum opening when the movable pointer is at the extreme clockwise end of the meter scale 100 and at maximum opening when the movable pointer is at the counterclockwise end of the meter scale. The meter scale is graduated in accordance with the micro-ammeter and photocells for meter needle deflections in actual *f* stops representing each doubling or halving of light intensity.

The time dial rotates in the same direction as the moving pointer and shutter speed dial and is positioned relative to the *f* stop dial to give a correct exposure product when the meter needle and moving pointer are aligned in the same space position. Hence, the time dial must rotate at a rate sufficient to change the exposure product to match the moving pointer change in *f* stops on the meter scale plus the equivalent corresponding change in *f* stops of the relative opening of the variable aperture.

The shutter speed dial is positioned relative to the variable aperture and the meter scale to indicate the correct *f* stop and shutter speed relationship for any given light intensity. This is true for all conditions since when the time dial is turned to double the shutter speed, the variable aperture will be halved and the meter needle will read one *f* stop lower. If the film speed is doubled, the shutter speed is doubled and the meter needle remains unchanged. The range of shutter speeds is equal to the range of the variable aperture and is shifted faster or slower with film speed. The time dial and *f* stop dial are calibrated relative to each other to indicate all equal and possible exposure products of *f* stop openings times shutter speeds. The *f* stop dial markings of *f* stops and film speeds are such that the angular spacing of one *f* stop (the doubling or halving of the relative camera device opening) is equal to the angular spacing between each doubling or halving of film speed. This angular spacing being the same between the doubling and halving of shutter speeds on the time dial and shutter speed dial.

The *f* stop dial rotates completely independent of the other dials and is moved only to set the film speed index.

The switch for connecting the photoelectric cells to the micro-ammeter in different relations to each other so that the meter may be used either for shutter speed and *f* stop determination or for color balance is preferably actuated by means of the cable drive ring or disk 96. This switch may be of any suitable or desired construction, and as shown by way of example in Figs. 10 to 14, includes two stationary contact arms 120 having contact terminals 121 near the ends thereof and two movable contact arms 122 which also have contact terminals 123. In addition, the switch includes two movable contact arms or members 124 having terminals thereon positioned to contact either with the terminals 121 or with the terminals 123. All of these terminal arms are mounted in a suitable supporting member 125, which in the construction shown in the form of a U-shaped bracket having the free ends of the legs secured to the frame member 31. Within this bracket are suitable insulating supports for the contact arms, all of which are made of thin strips of a suitable metal, the arms 124 and 122 being made of flexible metal so that their outer ends can be swung about the insulating supports within the bracket 125. The six contact arms 120, 122 and 124 extend beyond both ends of the supporting bracket 125 as shown in Figs. 11, 12 and 14 forming short extensions 126 to which conductors from the photoelectric cells may be attached, as shown in Fig. 5, in which the two sets of contact arms for sake of clarity are shown one above the other, instead of side by side as in Figs. 11 to 14.

The circuitry including the photoelectric cells, the switch and the ammeter is shown in Fig. 5, but not described in detail since it is, of course, obvious to any one skilled in the art how the various connections may be made to produce the circuits which are shown in their simplest form in Figs. 3 and 4. The connections shown in Fig. 5 are those used when the light meter is used for determining shutter speed and *f* stops, for which the color balance dial must be set as shown in Figs. 2, 5 and 10, in which the roller 146 is in the low part of the cam 145.

While the use of a switch as described for placing the two photoelectric cells in parallel for determining light intensity is preferred, since it results in a light meter of high accuracy and sensitivity, yet it will be obvious that it is possible to simplify the construction of the meter by using only one of the two cells for measuring light intensity, which can be done either electrically by breaking the circuit from one cell to the micro-ammeter or optically by intercepting the passage of light to one of the cells.

The actuation of the switch to move the movable contact members 124 into engagement with either the terminals 121 or 123 is preferably effected through the medium of a switch actuating arm 130 which is pivoted to swing about a pivot member 131 suitably mounted on the bracket 125. This arm 130 has a laterally extending portion 132, see Figs. 11 to 13, the end of which is bifurcated to straddle the ends of the movable switch members 124 and suitable insulating pieces 134 are arranged between the arm 130 and the movable switch members 124, the insulating pieces also connecting the ends of these switch members, so that they move in unison.

There is also pivoted on the pivot member 131 a disk 135 having a notch 136 formed in the periphery thereof. This disk has a pin 137 secured thereto which extends into an arcuate slot 138 formed in the switch actuating arm 130 so that the disk 135 may rotate to a limited extent without producing any motion of the switch actuating arm 130. The disk 135 is swung about its pivot by means of a stud or projection 140 secured on the cable drive ring or disk 96. When the disk 96 is rotated in a counterclockwise direction from the position shown in Fig. 10, the stud 140 will enter into the recess 136 of the disk and swing the same from the position shown in Fig. 10 into that shown in Fig. 12. This causes the pin 137 to move in the slot 122 in such manner that the switch actuating arm 130 will move the switch members 124 from the position in which they contact with the contacts 123 to a position as shown in Fig. 12, in which they contact with the terminals 121. 141 represents a spring having one end pivoted on the bracket 125, and the other end pivoted on an outwardly extending arm 142 of the disk 135. The pivoted ends of the spring are so positioned that when the switch actuating member 130 swings from one extreme position to another, it passes through a dead center relationship with the spring 141 so that the switch actuating member will be yieldingly held in either of its two contacting positions. It will be noted that when the cable drive disk is moved into the position shown in Fig. 12, the pointer 102 will be off the scale 100 to the left and the sleeves 50 and 51 will be in position to admit a maximum of light to the photocells, yet providing narrow rectangular openings for color balance measurements. A switch of any other suitable or desired construction may be employed, if desired.

It is also possible to break the circuit through the switch when the movable switch members 124 are in position to engage the terminals 123. This is done by turning the color balance dial 46 mounted on the side of the instrument. This dial has a cam-shaped groove 145 in which a roller 146 is arranged, this roller being mounted on an arm 147 secured on and extending outwardly from the contact arms 122. The arm 147 extends through an opening 148 in the frame member 31. Conseqently, by turning the color balance dial 46, the contact arm 122 may be swung into a position upwardly out of contact with the movable contact arm 124 so that the switch will be in open circuit position thereby preventing light intensity measurements unless the dial 46 is in the position marked "Exp" corresponding to the clear portion of sleeve 43 in a position between the photocells and the lens.

In order to assure maximum accuracy of the instrument, it is necessary to construct the same for checking and adjusting the null or zero reading of the instrument, since this is important to ensure correct color balance readings. This may be done, for example, by employing the color balance circuitry, and to do this, the time dial is turned fully counterclockwise and the color balance dial 46 is turned to the "exposure" position in which the letters "Exp" on the periphery of the color balance dial 46 are at a fixed pointer 149. Under these conditions, the clear portion 76 of the filter ratio sleeve 43 will be between the photocells and the lens, and the aperture opening for each photocell is identical. Then if the light falling on the front of the light meter is uniform, each photocell will receive an equal amount of radiant energy and the two cells should generate equal currents so that the microammeter will read zero or "null." Very frequently, one photocell will be slightly more sensitive than the other, in which case, the meter will not read "null." While in general these slight differences will have a negligible effect on the accuraey of the instrument, yet if highly accurate results are desired, the difference in the two photocells can be compensated for by means of a ratio bar 150, Figs. 10 and 22.

This ratio bar may be made of rod or strip of thin flat metal or other material having a width which is much greater than its thickness. This strip or rod is then twisted intermediate of its ends so that the flat sides of one-half of the ratio bar will extend to approximately 90 degrees of the flat sides of the other half of this bar. The ends of the ratio bar are rotatably mounted on the end walls of the photocell holder 60 in any suitable manner, and one end of this bar is suitably secured to an adjusting screw 151 having a threaded engagement in an end wall of the photocell holder, as shown in Fig. 14. By rotating the ratio bar, for example, through an opening in the side of the light meter housing, it will be obvious that the passage of light to one or other of the photocells may be obstructed to a slight extent when a flat face of the ratio bar extends crosswise of the direction of the light to such cell. The position of the ratio bar or a slight difference in the current generated by the two cells will have no practical bearing on the use of the light meter for exposure measurements, since under those conditions, the photocells are connected in parallel, but for accurately determining color balance, the two cells, when receiving equal amounts of light, should generate equal amounts of electricity.

Since it is important that the light falling on the lens of the light meter give equal illumination of each photocell section for color balance measurements, it is desirable that the meter be pointed squarely at the source of illumination with the light selector sleeve 33 formed for either incident or reflected light as determined by the desire to obtain an average measurement of a broad general source of illumination or a reading of a single concentrated source of illumination. The filter ratio sleeve 43 is turned so the clear portion 76 is between the photocells and lens corresponding to the color balance dial knob 46 turned for exposure. If the circuit is then connected for color balance (or color temperature measurements), and if under this condition the meter needle does not read "null," the light meter is either not pointed squarely at the light source or the "null" balance adjustment requires calibration by means of the sensitivity ratio bar 150. It is best to use a broad diffuse source of illumination to readily check the "null" balance adjustment.

The purpose of the inner and outer aperture sleeves 50 and 51, is primarily, to decrease the sensitivity of the photocells for very bright conditions in a manner mathematically related to the computer dials, meter scale values, and the moving pointer system. In addition, the aperture sleeves provide a method of obtaining a horizontally wide and vertically narrow aperture over each photocell. This is used to limit the active zone of the filter ratio sleeve for maximum accuracy and resolution during color balance measurements. This narrow aperture is formed by the ends of the wedge-shaped openings when rotated beyond the maximum aperture position. This is the condition established by the time dial 114 when it is in the "color temperature" position. In this position a colored spot 155 on the time dial is positioned opposite the colored spot 156 on the stationary meter scale 100.

In the use of the light meter described, the light meter should first be set for the speed of the film which is to be used, and this is accomplished by turning the f stop dial 105 by means of the knob 106 until the film speed on the scale 119 appears in the window or notch 118 provided in the stationary disk 104. The light meter is then set for either incident or reflected light by turning the light selector knob 38. This actuates the sleeve 33 so that either the clear part 72, shown in Fig. 6, or the light scattering part 73, is between the lens and the photoelectric cell. The light meter should then be set for color balance determined by turning the time dial in a counterclockwise direction from the position shown in Fig. 1 to the position in which the stud 140 enters the slot 136 of the switch actuating disk 135 so that the movable members 124 of the switch will be set for color balance measurements in which the movable members 124 make contact with the lower contact terminals 121, in which position the colored spot 155 on the time dial is adjacent to the colored spot 156. When these two spots are in this position, the meter will be set for color balance or color temperature position, and if desired, the finding of this position may be further facilitated by the word "color" on the meter dial adjacent to the spot 156, and the letters "temp" on the time dial adjacent to the spot 155. When the time dial is in correct position, the letters "temp" will be immediately underneath the word "color." If it is desired to check the "null" balance adjustment for maximum accuracy, the meter light opening should be directed towards a broad diffuse source of illumination, the color balance dial 46 is turned into a position in which the "Exp" meaning "exposure" are arranged opposite a pointer 149. This pointer is preferably arranged on or forms a part of a relatively thin flat plate 154 secured on the housing of the light meter and extending between the dials 46 and 37. When the two sleeves are in these positions, in which neutral density light transmitting portions of the outer two sleeves are in registration to permit the equal unfiltered light to pass from the lens to the two photoelectric cells, the meter needle should point to the zero or "null" position, and if it does not do so, the adjusting screw 151 to which the ratio bar 150 is connected should be turned until the meter needle reads zero or "null."

In order to determine the color balance, the light meter should be pointed squarely at the source of illumination falling on the scene or object which is to be photographed. This source of illumination may be the sun or the sky above the scene or an artificial light. If it is assumed that the "null" balance adjustment is in correct calibration as will be the general case over long periods of time, the meter needle will read "null." If it does not read "null," it is an indication that more light is falling on one photocell section and the pointing of the meter should be altered for a "null" reading. The color balance dial 46 is then turned from the "exposure" position to turn the sleeve 43 until a new position in the calibrated region of dial 46 is found. The color temperature of the light source can then be read directly on the dial knob 46, the graduations of which are clearly shown in Fig. 21. This reading will enable the user of the instrument to determine the proper light correction filter to employ.

As before stated, it is possible to use two light filter sleeves instead of the single sleeve shown in Fig. 7 and such additional light filter sleeve would then be provided with a screen or insert 77 of a different color which could then be rotated after the first screen had been turned to a position in which the clear space 76 of the sleeve shown in Fig. 7 is between the lens and the photoelectric cells. Such additional sleeve could be turned by another dial similar to the dial 46. For sake of clarity, however, only a single color balance sleeve and dial are shown. The purpose of these sleeves is to determine the ratio of light in one portion of the spectrum as compared to another portion or the total spectrum.

In order to determine the exposure to which the film should be subjected, two methods are available by either the incident or reflected light system. According to the first of these two methods, the meter will give the operator a choice of different combinations of f stops and shutter speeds, and according to the second method, the instrument may be set for a selected shutter speed and the light meter is then used only for the purpose of determining the f stop to be used in connection with such selected speed.

According to the first method, the time dial 114 is turned in a clockwise direction, so that the stud 140 disengages the slot 136 in the switch setting disk 135. The temperature balance dial 46 is set so that the letters "Exp." thereon are opposite the small pointer 149, in which position, the roller 146 will be lowered due to the fact that it is a depressed portion of the cam-shaped groove 145 so that the contacts 123 of the switch will be in position to engage with the corresponding contact on the switch member 124. The light selector knob 38 is then moved into either of two positions. If it is desired to take the light measurement by the reflected light method, the knob 38 is moved opposite to the letter "R" on the front face of the housing, shown in Fig. 1. In this case the clear part 72 of the sleeve 33 as shown in Fig. 6 will be in position between the lens and the photoelectric cells, thus providing a narrow light acceptance angle. If it is preferred to take the measurement by means of the incident light method, the light selector knob 38 is moved into a position opposite the letters "Inc." on the back of the meter housing, as shown in Fig. 17, in which case the light scattering or diffusing portion 73 of sleeve 33 will be between the lens and the photoelectric cells, thus providing a wide light acceptance angle. If light measurements are taken by the reflected light method, the light meter is pointed at the scene to be photographed. If the light measurement is to be taken by the incident light method, the light meter is held adjacent to the subject or scene to be photographed and is pointed toward the camera. This time dial 114 is then turned to vary the light admitted to the photoelectric cells until the moving pointer 102 connected therewith is correctly disposed with relation to the meter needle position, i.e., set for the same scale value. When this is done the correct f stops and shutter speeds on the f stop dial and time dials respectively will be opposite each other and the photographer may select any shutter speed and the f stop opposite thereto, and set his camera accordingly.

It will be noted that the meter scale 100 is divided into portions with an upper portion of f stops of equal spacing. This equal spacing corresponds and is mathematically related to the equal spacings between f stops on the computer dials and between the variation in aperture of the variable aperture sleeves 50 and 51. To provide the correct mathematical relationship between the response of the microammeter to current generated by light on the photocells, a central portion of the meter scale 100 is used to relate the actual meter deflection in f stops to the relationship established in the computer dials, moving pointer and variable aperture. This is of particular value near the zero position where the response of the conventional logarithmic microammeter is essentially linear.

Consequently, at the left side of the meter scale 100, shown in Fig. 1, it will noted that lines 153 are provided which extend from the numeral 2, from the number 1.4 and from the letter "f" to three points on the meter scale close to the "null" or zero indicated thereon, and consequently, if the meter needle points to any one of these three points on the scale, the pointer should be moved to the positions on the upper part of the scale at which the upper ends of the lines 153 terminate. It will, of course, be readily understood that when the time dial 114 is turned, the gear 115 secured thereto is also turned, which results in turning of the pinion 110 and the corresponding turning of the cable drive, which results in the adjusting of the two sleeves 50 and 51 relatively to each other to vary the amount of light passing to the photoelectric cells. When this amount of light admitted by the sleeves 50 and 51 turns the meter needle 92 into a position corresponding to the position of the pointer 102, then the correct relation between the $f$ stops and the shutter speeds is established.

To employ the direct reading method, the time dial 114 is turned until the desired shutter speed from the scale on the shutter speed dial 108 shown in Fig. 20 appears in the window or opening 117 in the $f$ stop dial 105. The turning of the time dial 114 in turn rotates the gear 115 which rotates the pinion 110. The stud 109 on which the pinion rotates is mounted directly on the shutter speed dial 108 so that this dial may be turned by turning the time dial 114. When this is done, the pointer mounted on the cable drive ring is ignored. The light meter is then pointed to obtain a light reading as heretofore stated. The $f$ stop is then read directly from the meter scale at the portion thereof to which the meter needle points. This latter method simplifies the use of the meter for exposure determinations. In that case, the photographer determines what shutter speed is desired, and it is, therefore, merely necessary to determine the $f$ stop to be used with that shutter speeed.

The light meter described is particularly desirable for use by amateur photographers, in that the same is easy to read, readily portable, compact and complete in itself, and presents all needed information for all conditions and methods of photography. The light meter features dual usage of the major components of the same, so that the same can be produced at a lower cost than the combined cost of color balance and exposure meters heretofore available, and can be assembled in a case no larger than the cases of prior color balance or exposure meters. The light meter can be easily and quickly converted from one type of measurement to the other by merely turning the color balance dial or the time dial to the proper positions. Since the light meter will not read unless the dials are in the right position, this provides a simple and foolproof dial interlock system, thereby preventing incorrect readings.

My improved light meter uses a logarithmic null indicator type micro-ammeter with increased sensitivity at the zero or "null" position for determination of both color balance and exposure. This feature greatly increases the sensitivity and readability of the light meter for both types of measurements. Furthermore, this micro-ammeter is in a fixed mounting with a single fixed meter scale, thereby increasing ruggedness, simplicity of assembly and compactness.

The combination light meter is mechanically arranged to present all information, for both color temperature and exposure measurements, at the top half of the light meter face as held in the left hand and manipulated by the right hand. This feature enables the light meter to be manipulated and read while the meter is pointed for the scene. This very greatly increases the readability and convenience of operation and is an important feature.

By placing the color balance dial knob on the side of the light meter case with the graduations arranged so they are not visible when exposure measurements are being made, improved appearance and minimum chance of confusion are obtained.

The use of two photoelectric cells is preferable to methods using one photocell, since the meter needle deflections are greater for equal variations of color balance, thus increasing sensitivity and accuracy. Most important, however, is the fact that the two photocell method is essentially independent of light intensity, thereby decreasing the possibilities of error.

My improved light meter has the further advantage that my synchronizing the variable light aperture with the computer dials, the need for the usual "high" and "low" ranges of other light meters is eliminated, together with other complications involved with such ranges. This simplifies the operation of the instrument and greatly minimizes the possibility of errors.

As an exposure meter, the epicyclic gearing which causes the time dial to rotate more rapidly than the moving pointer, not only aids in setting the moving pointer for accurate readings, but increases the spacing between all markings on all dials. This permits larger bolder markings, thereby improving readability, appearance, and accuracy. Furthermore, this arrangement provides room for markings of movie "frames per second," thus further simplifying the dial arrangement.

My improved light meter has the further advantage that it is easy to manipulate because it is complete in itself and requires no accessories or attachments which might become lost or mislaid.

It will, of course, be understood that the word "film" is herein employed in a broad sense to indicate any light sensitive emulsion and the term "$f$ stop" is employed to include other designations for also indicating other measures of the light admitted to a camera lens.

It will be understood that various changes in the details, materials, and arrangements of parts which have been herein described and illustrated in order to explain the nature of the invention, may be made by those skilled in the art within the principle and scope of the invention, as expressed in the appended claims.

I claim:

1. In a light meter having a first circuit for measuring light intensity and a second circuit for measuring color balance, the combination of a meter, a pair of individual photovoltaic cells, said first circuit having movable electrical contact means for wiring said photovoltaic cells in parallel with said meter with said photovoltaic cells being wired with opposing polarity to each other, said second circuit having means coacting with said contact means for wiring said photovoltaic cells in parallel with said meter with said photovoltaic cells being wired with additive polarity to each other, means for switching said contact means for said photovoltaic cells to thereby switch said photovoltaic cells from said parallel opposing connection to said parallel additive connection, a housing for said light meter, a window in said housing through which light passes to said photovoltaic cells, movable light filtering means having a filtering position in which the filter is interposed in the optical path between said window and one of said photovoltaic cells, and means for moving said light filtering means into filtering position when measuring color balance and out of filtering position when measuring light intensity.

2. In a light meter as in claim 1 and wherein said light filtering means comprises an endless screen and having one of said photovoltaic cells positioned within the volume described by said endless screen.

3. In a light meter as in claim 1 and wherein said light filtering means comprises an endless screen, said photovoltaic cells being positioned within the volume described by said endless screen, said screen having a reference aperture for one of said photovoltaic cells and a light aperture for the other of said photovoltaic cells, said light aperture having a dimension varying along its length, and a light filter in said reference aperture.

4. In a light meter as in claim 1 and having an adjustable endless screen, said photovoltaic cells being mounted within the volume described by said screen, said screen having an opaque portion for shutting off light to said cells from said window, a clear portion for admitting substantially unobstructed passage of light to said cells from said window and a light scattering portion for transmitting diffused light to said cells from said window and means for adjusting said screen with respect to said window.

5. In a light meter as in claim 1 and having an adjustable endless screen, said screen having two wedge-shaped apertures, one of said photovoltaic cells mounted within the volume described by said screen and fixed relative to one of said apertures and the other of said photovoltaic cells mounted within the volume described by said screen and fixed relative to the other of said apertures, both of said photovoltaic cells being positioned relative to their respective aperture to receive light from said window, and means for moving said screen to vary the amount of light received on said photovoltaic cells.

6. In a light meter as in claim 1 and having a pair of adjustable endless screens in concentric relation with each other, one of said screens having a first pair of wedge-shaped apertures, the other of said screens having a second pair of wedge-shaped apertures, said first pair of wedge-shaped apertures extending in one direction on one of said screens, said second pair of wedge-shaped apertures on the other of said screens cooperating with said first pair of apertures and extending in a direction contra thereto, said cells being positioned within the common volume described by said screens to receive light through the cooperating apertures, and means for moving both of said screens with respect to the other and with respect to said cells to vary the light received on said cells.

7. In a light meter as in claim 1 and wherein said light filtering means comprises an adjustable endless screen, one of said photovoltaic cells being positioned within the volume described by said endless screen, and having another adjustable endless screen, said photovoltaic cells being mounted within the volume described by said another screen, said another screen having an opaque portion for shutting off light to said cells from said window, a clear portion for admitting a substantially unobstructed passage of light to said cells from said window and a light scattering portion for transmitting diffused light to said cells from said window and means for adjusting said screen with respect to said window.

8. In a light meter as in claim 1 and wherein said light filtering means comprises an adjustable endless screen, one of said photovoltaic cells positioned within the volume described by said endless screen, and having another adjustable endless screen in concentric relation with the first mentioned endless screen, said another screen having two wedge-shaped apertures, one of said photovoltaic cells mounted within the volume described by said another screen and fixed relative to one of said apertures and the other of said photovoltaic cells mounted within the volume described by said another screen and fixed relative to the other of said apertures, both of said photovoltaic cells being positioned relative to their respective aperture to receive light from said window, and means for moving said another screen to vary the amount of light received on said photovoltaic cells.

9. In a light meter as in claim 1 and having an adjustable endless screen, said photoelectric cells being mounted within the volume described by said screen, said screen having an opaque portion for shutting off light to said cells from said window, a clear portion for admitting substantially unobstructed passage of light to said cells from said window and a light scattering portion for transmitting diffused light to said cells from said window, means for adjusting said screen with respect to said window, another adjustable endless screen in concentric relation to the first mentioned screen, said another screen having two wedge-shaped apertures, one of said photovoltaic cells mounted within the volume described by said another screen and fixed relative to one of said apertures and the other of said photovoltaic cells mounted within the volume described by said another screen and fixed relative to the other of said apertures, both of said photovoltaic cells being positioned relative to their respective aperture to receive light from said window, and means for moving said screen to vary the amount of light received on said photovoltaic cells.

10. In a light meter as in claim 1 and wherein said light filtering means comprises an adjustable endless screen, one of said photovoltaic cells positioned within the volume described by said endless screen, and having a second adjustable endless screen in concentric relation to the first mentioned endless screen, said photovoltaic cells being mounted within the volume described by said second screen, said second screen having an opaque portion for shutting off light to said cells from said window, a clear portion for admitting substantially unobstructed passage of light to said cells from said window and a light scattering portion for transmitting diffused light to said cells from said window, means for adjusting said second screen with respect to said window, a third adjustable endless screen in concentric relation with the first two mentioned screens, said third screen having two wedge-shaped apertures, one of said photovoltaic cells mounted within the volume described by said third screen and fixed relative to one of said apertures and the other of said photovoltaic cells mounted within the volume described by said third screen and fixed relative to the other of said apertures, both of said photovoltaic cells being positioned relative to their respective aperture to receive light from said window, and means for moving said third screen to vary the amount of light received on said photovoltaic cells.

11. In a light meter as in claim 1 and wherein said light filtering means comprises an endless screen, said photovoltaic cells being positioned within the volume described by said endless screen, said screen having a reference aperture for one of said photovoltaic cells and a light aperture for the other of said other photovoltaic cells, said light aperture having a dimension varying along its length, said reference aperture having a light filter therein, and having a second adjustable endless screen concentric with said first mentioned endless screen, said photovoltaic cells being mounted within the volume described by said second screen, said second screen having an opaque portion for shutting off light to said cells from said window, a clear portion for admitting substantially unobstructed passage of light to said cells from said window and a light scattering portion for transmitting diffused light to said cells from said window, means for adjusting said screen with respect to said window, a third adjustable endless screen and a fourth adjustable endless screen in concentric relation with each other and with the first two mentioned screens, said third screen having a first pair of wedge-shaped apertures, said fourth screen having a second pair of wedge-shaped apertures, said first pair of wedge-shaped apertures extending in one direction on said third screen, said second pair of wedge-shaped apertures on said fourth screen cooperating with said first pair of apertures and extending in a direction contra thereto, said cells being positioned within the common volume described by said third and fourth screens to receive light through the cooperating apertures, and means for moving said third and said fourth screens with respect to each other and with respect to said cells to vary the light received on said cells.

12. In a light meter as in claim 1 and having means within said switching means to prevent switching from said second circuit to said first circuit when said light filtering means is in position for measuring color balance.

13. In a light meter as in claim 1 and wherein said light filtering means comprises an adjustable endless screen, one of said photovoltaic cells being positioned within the volume described by said endless screen, and having a connection between said endless screen and said switching means to prevent switching from said second circuit to said first circuit when said endless screen is in filtering position.

14. In a light meter as in claim 1 and wherein said light filtering means comprises an adjustable endless screen, one of said photovoltaic cells positioned within the volume described by said endless screen, said switching means having two pairs of movable contacts, one pair of said contacts movable into position with the other of said pair of contacts to connect said cells and said meter in said first circuit, and a connection between said other pair of contacts and said endless screen for moving said other pair of contacts out of operative position with respect to said one pair of movable contacts when said endless screen is moved into filtering position.

15. In a light meter as in claim 1 and having an adjustable endless screen, said screen having two wedge-shaped apertures, one of said photovoltaic cells mounted within the volume described by said screen and fixed relative to one of said aperture and the other of said photovoltaic cells mounted within the volume described by said screen and fixed relative to the other of said apertures, both of said photovoltaic cells being positioned relative to their respective aperture to receive light from said window, means for moving said screen to vary the amount of light received on said photovoltaic cells, and connecting means between said endless screen and said switching means for switching said cells and said meter from said first circuit to said second circuit when said endless screen is in the desired position for measuring color balance.

16. In a light meter as in claim 1 and having an adjustble endless screen, said screen having two wedge-shaped apertures, one of said photovoltaic cells mounted within the volume described by said screen and fixed relative to one of said apertures and the other of said photovoltaic cells mounted within the volume described by said screen and fixed relative to the other of said apertures, both of said photovoltaic cells being positioned relative to their respective aperture to receive a light from said window, means for moving said screen to vary the amount of light received on said photovoltaic cells, said switching means having one pair of movable contacts, another pair of movable contacts, and a pair of fixed contacts, said another pair of movable contacts being movable into position to contact said one pair of movable contacts to connect said cells and said meter in said first circuit and said pair of movable contacts movable into position to connect said cells and said meter in said second circuit, connecting means between said other pair of movable contacts and said endless screen to move said other pair of movable contacts into position to contact said one pair of movable contacts and into position to contact said pair of fixed contacts.

17. In a light meter as in claim 1 and wherein said light filtering means comprises an endless screen, said photovoltaic cells being positioned within the volume described by said endless screen, said screen having a reference aperture for one of said photovoltaic cells and a light aperture for the other of said photovoltaic cells, said light aperture having a dimension varying along its length, said reference aperture having a light filter therein, and having a second adjustable endless screen concentric with said first mentioned endless screen, said photovoltaic cells being mounted within the volume described by said second screen, said second screen having an opaque portion for shutting off light to said cells from said window, a clear portion for admitting substantially unobstructed passage of light to said cells from said window and a light scattering portion for transmitting diffused light to said cells from said window, means for adjusting said screen with respect to said window, a third adjustable endless screen and a fourth adjustable endless screen in concentric relation with each other and with the first two mentioned screens, said third screen having a first pair of wedge-shaped apertures, said fourth screen having a second pair of wedge-shaped apertures, said first pair of wedge-shaped apertures extending in one direction on said third screen, said second pair of wedge-shaped apertures on said fourth screen cooperating with said first pair of apertures and extending in a direction contra thereto, said cells being positioned within the common volume described by said third and fourth screens to receive light through the cooperating apertures, means for moving both of said screens with respect to the other and with respect to said cells to vary the light received on said cells, said switching means having one pair of movable contacts, another pair of movable contacts and a pair of fixed contacts, said pair of movable contacts movable into position to contact said one pair of movable contacts to connect said cells and said meter in said first circuit and said other pair of movable contacts movable into position to contact said pair of fixed contacts to connect said cells and said meter in said second circuit, connecting means between said other pair of movable contacts and said third and said fourth screens to move said other pair of contacts into position to contact said one pair of movable contacts and into position to contact said pair of fixed contacts, connecting means between said one pair of movable contacts and said one screen to move said one pair of movable contacts out of operative position with respect to said other pair of movable contacts when said one screen is moved into filtering position.

References Cited in the file of this patent

UNITED STATES PATENTS

| | | |
|---|---|---|
| 2,076,481 | Riszdorfer | Apr. 6, 1937 |
| 2,092,826 | Bernard et al. | Sept. 14, 1937 |
| 2,101,932 | Eggert et al. | Dec. 14, 1937 |
| 2,163,737 | Prinsen | June 27, 1939 |
| 2,206,086 | Galyon | July 2, 1940 |
| 2,285,761 | Tonnies | June 9, 1942 |
| 2,298,667 | Weymouth | Oct. 13, 1942 |
| 2,330,877 | Fleischer et al. | Oct. 5, 1943 |
| 2,455,116 | Gittus | Nov. 30, 1948 |
| 2,462,823 | Woodward | Feb. 22, 1949 |
| 2,482,281 | Lingel | Sept. 20, 1949 |
| 2,579,347 | Taylor | Dec. 18, 1951 |
| 2,667,809 | Williams | Feb. 2, 1954 |
| 2,674,154 | Crandell | Apr. 6, 1954 |
| 2,706,428 | Pfaffenberg et al. | Apr. 19, 1955 |

FOREIGN PATENTS

| | | |
|---|---|---|
| 412,096 | Great Britain | June 21, 1934 |
| 453,845 | Great Britain | Sept. 18, 1936 |
| 665,942 | Great Britain | Feb. 6, 1952 |